US006254241B1

(12) United States Patent
Unger et al.

(10) Patent No.: US 6,254,241 B1
(45) Date of Patent: Jul. 3, 2001

(54) POLYGONAL ILLUMINATION REFLECTOR

(75) Inventors: Helmuth K. Unger, Menden (DE); Wolfram Peters, CD leiden (NL)

(73) Assignee: WILA Leuchten AG, Sevelen SG (CH)

( * ) Notice: Subject to any disclaimer, the term of this patent is extended or adjusted under 35 U.S.C. 154(b) by 0 days.

(21) Appl. No.: 09/504,986

(22) Filed: Feb. 14, 2000

(30) Foreign Application Priority Data

Feb. 13, 1999 (DE) ........................................ 199 06 091

(51) Int. Cl.[7] ........................................ G02B 5/08

(52) U.S. Cl. ........................ 359/855; 359/856; 359/857; 359/858; 359/866

(58) Field of Search ........................ 359/855, 856, 359/857, 858, 866, 853; 362/296, 297, 298

(56) References Cited

U.S. PATENT DOCUMENTS

| | | | |
|---|---|---|---|
| 3,937,948 * | 2/1976 | Allison | 240/4.1 |
| 4,509,501 * | 4/1985 | Hunter | 126/439 |
| 4,675,791 * | 6/1987 | Montgomery | 362/3 |
| 4,789,921 | 12/1988 | Aho | 362/348 |
| 5,278,744 * | 1/1994 | Geboers et al. | 362/348 |

FOREIGN PATENT DOCUMENTS 4136251 5/1992 (DE) .

* cited by examiner

*Primary Examiner*—Mohammad Sikder

(74) *Attorney, Agent, or Firm*—Flanagan & Flanagan; John R. Flanagan; John K. Flanagan

(57) ABSTRACT

A polygonal illumination reflector includes a support base and a configuration of discrete reflector elements supported by the support base. The reflector elements have respective pairs of opposite side edges and respective interior reflective surfaces. The reflector elements adjoin one another in providing the configuration. The support base has a plurality of adjacent side portions and a plurality of retaining pockets defined between and interconnecting the adjacent side portions to one another. The adjacent side portions of the support base correspond in number to the reflector elements. The retaining pockets are arranged in pairs wherein the retaining pockets of each pair are open in a facing relationship toward one another so as to receive therein and set in engagement therewith the opposite side edges of the reflector elements in a first sequence in the configuration. The reflector elements in a second sequence in the configuration are disposed between the reflector elements of the first sequence and supported by corresponding ones of the side portions of the support base such that the reflective surfaces of the reflector elements of the first sequence and the opposite side edges of the reflector elements of the second sequence together form spaced apart inner edges on the configuration of discrete reflector elements.

18 Claims, 1 Drawing Sheet

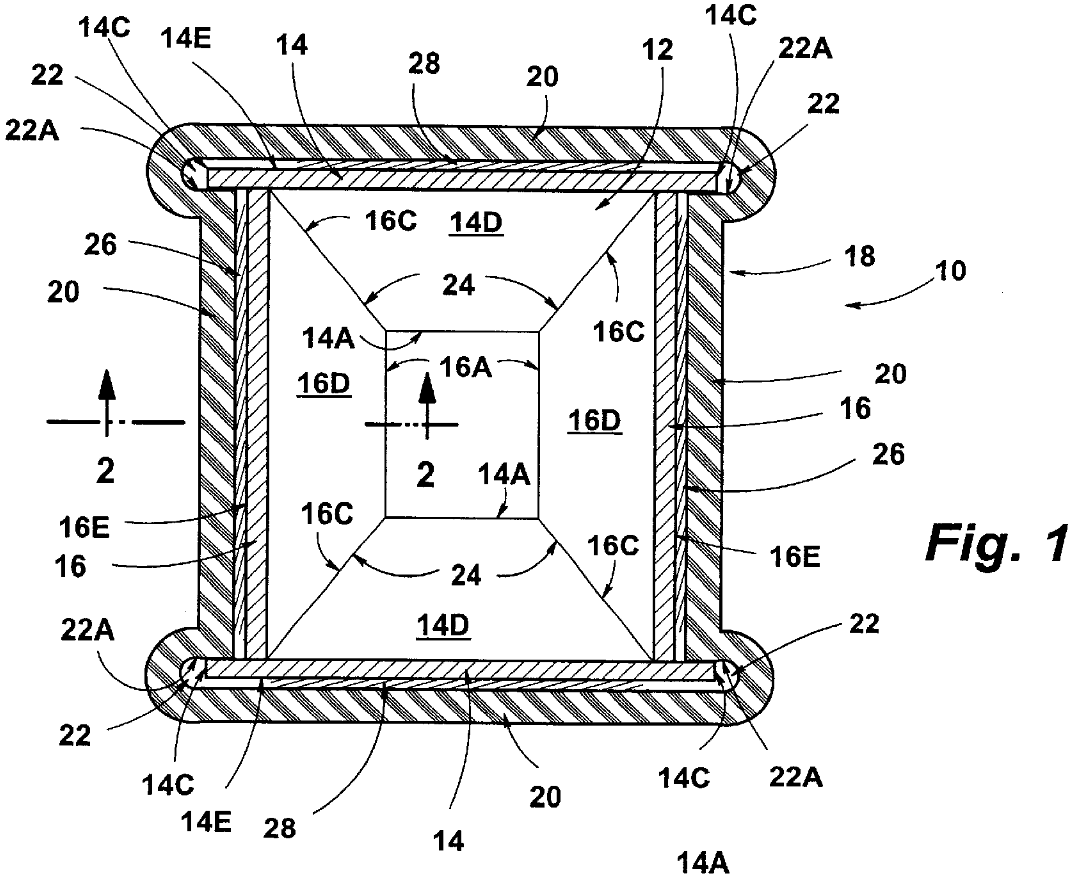
Fig. 1
Fig. 2
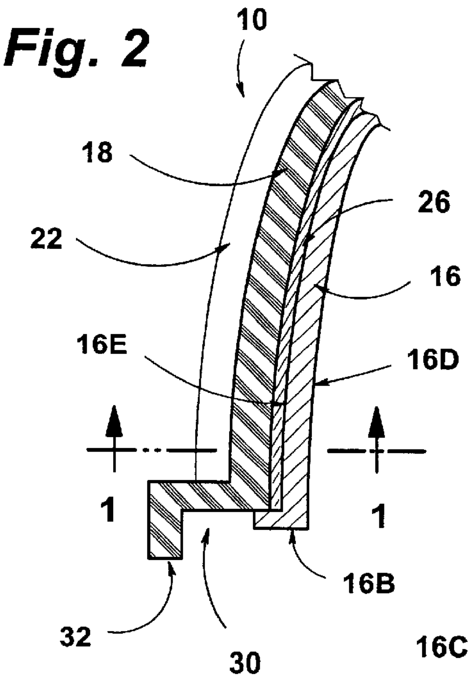
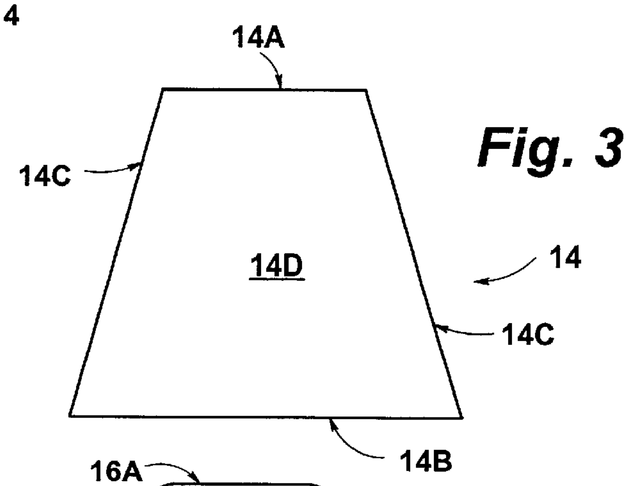
Fig. 3
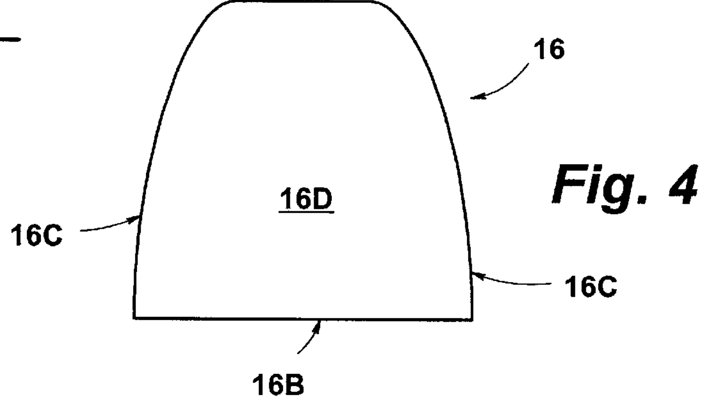
Fig. 4

POLYGONAL ILLUMINATION REFLECTOR

BACKGROUND OF THE INVENTION

1. Field of the Invention

The present invention generally relates to a polygonal reflector for an illumination means, for example an incandescent bulb or the like, and, more particularly, is concerned with a polygonal illumination reflector having a support base and configuration of discrete reflector elements adjoining one another such that opposite side edges of selected ones of the reflector elements are retained in paired facing pockets of the support base.

2. Description of the Prior Art

Polygonal reflectors which can be rectangular, for example, in order to attain specific illumination effects are required by users. Such a polygonal reflector includes a configuration of discrete reflector elements adjoining one another. The reflector elements can be polished, chromium-plated or also superficially satinized metal sheets or also aluminum pieces whose surface is highly polished and subsequently anodized, which are connected one with the other at their edges for forming the reflector. The reflector elements are commonly provided with a given curvature in order to meet the desired requirements of illumination engineering.

The discrete reflector elements of this configuration are also connected to one another by alternately formed-on clips and lead-through openings provided in the regions of opposite side edges of the reflector elements. Two of the reflector elements adjoining one another are fastened one to the other by sliding the clip of the one reflector element into the corresponding opening of the other reflector element and by subsequent bending-over of the clip. However, the bending-over of such fastening clip in order to fasten together the two reflector elements adjoining one another leads to straightening of the given curvature of the reflector element in this region thereof such that this portion of the reflector formed by the reflector elements is noticeable due to a bright luminous corona or similar irregularity which, in turn, is perceived as being disturbing to the user.

Further polygonal reflectors are known, which are produced of one piece by way of a cold-forming process, for example deep drawing. These polygonal reflectors in the boundary region of two adjoining reflector elements form a flute. Even if such a polygonal reflector could be produced wherein the flutes are of small radii, these flutes nevertheless produce light strips when the reflector is being used, which likewise are perceived as unpleasant by the user. The same problem is also encountered in the case of such polygonal reflectors which are produced, for example, of synthetic materials and whose insides are vapor-deposited with a reflecting layer. A further disadvantage here is that the reflection surface cannot be worked subsequently, or only with high expenditure, to generate different properties in terms of illumination engineering.

SUMMARY OF THE INVENTION

The present invention overcomes the aforementioned problems by providing a polygonal illumination reflector that not only meets requirements of users in terms of illumination engineering but also can be produced with simple and inexpensive fabrication techniques.

Accordingly, the present invention is directed to a polygonal illumination reflector which comprises: (a) a configuration of discrete reflector elements having respective pairs of opposite side edges and interior reflective surfaces, the reflector elements adjoining one another in providing the configuration thereof; and (b) a support base supporting the configuration of discrete reflector elements, the base having a plurality of adjacent side portions and a plurality of retaining pockets defined therebetween being arranged in pairs wherein the retaining pockets of each pair open in a facing relationship toward one another so as to receive therein and set in engagement therewith the opposite side edges of the reflector elements in a first sequence in the configuration and the reflector elements in a second sequence in the configuration being disposed between the reflector elements of the first sequence are supported by corresponding ones of the side portions of the base such that the reflective surfaces of the reflector elements of the first sequence and the opposite side edges of the reflector elements of the second sequence together form spaced apart inner edges on the configuration of discrete reflector elements.

More particularly, each of the reflector elements is flexible and its reflective surface faces toward the reflective surface of one other of the reflector elements. The side portions of the base have curvatures which provide the reflector elements and thereby the reflective surfaces thereon with corresponding reflective curvatures. The polygonal reflector also includes means for fastening the reflector elements to corresponding ones of the side portions of the base. The fastening means preferably is an adhesive material that provides an adhesion connection of the reflector elements to the corresponding ones of the side portions of the base.

Additionally, the reflector elements of the first sequence have generally trapezoidal profiles with the opposite side edges of such reflector elements being substantially straight and converging toward one another. The reflector elements of second sequence also have generally trapezoidal profiles but the opposite side edges of such reflector elements are curved and converge toward one another.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a transverse sectional view a polygonal illumination reflector of the present invention taken along line 1—1 of FIG. 2.

FIG. 2 a fragmentary longitudinal sectional view of the polygonal reflector taken along line 2—2 of FIG. 1.

FIG. 3 is a layout view of one of a plurality of reflector elements of the polygonal reflector of FIG. 1.

FIG. 4 is a layout view of another one of the reflector elements of the polygonal reflector of FIG. 1.

DETAILED DESCRIPTION OF THE INVENTION

Referring to the drawings and particularly to FIG. 1, there is illustrated a polygonal illumination reflector of the present invention, generally designated 10. The polygonal reflector 10 basically includes an arrangement or configuration 12 of discrete reflector elements 14, 16 and a bearing body or support base 18 supporting the discrete reflector element configuration 12.

Referring to FIGS. 1, 3 and 4, each of the reflector elements 14 and 16 of the polygonal reflector 10 has respective pairs of opposite upper and lower edges 14A, 14B and 16A, 16B and opposite lateral or side edges 14C, 16C. Each of the reflector elements 14, 16 is flexible and also has an interiorly-disposed reflective surface 14D, 16D facing toward the reflective surface 14D, 16D of one other of the reflector elements 14, 16. For example, the reflector elements 14, 16 can be pieces of aluminum sheet whose reflective surfaces 14D, 16D are highly polished. The reflector elements 14, 16 adjoin one another such that the opposite side edges 16C of one of the reflector elements 16 are disposed adjacent to the reflective surfaces 14D of adjoining ones of the reflector elements 14.

Referring to FIGS. 1 and 2, the support base 18 of the polygonal reflector 10 includes a plurality of adjacent side portions 20 and a plurality of retaining pockets 22 defined therebetween and interconnecting the side portions 20. The side portions 20 and retaining pockets 22 correspond in number to the reflector elements 14, 16. Each of the side portions 20 of the support base 18 is substantially coextensive with and disposed adjacent to and outwardly of one of the reflector elements 14, 16. The support base 18 has open upper and lower ends. The retaining pockets 22 are arranged in pairs and define grooves 22A which with respect to each pair of retaining pockets 22 are open and in a facing relationship toward one another. The facing pockets 22 of each pair receive therein and set in engagement therewith the opposite side edges 14C of the reflector elements 14. The reflector elements 16 are supported by the corresponding ones of the side portions 20 of the support base 18 such that the reflective surfaces 14D of the reflector elements 14 and the opposite side edges 16C of the reflector element 16 together form a plurality of spaced inner edges 24 of the configuration 12 of discrete reflector elements 14, 16. The support base 18 of the polygonal reflector 10 also serves as a shape determining base for the reflector elements 14, 16 in that the side portions 20 of the support base 18 have curvatures which provide the reflector elements 14, 16 and thereby their reflective surfaces 14D, 16D with the desired corresponding reflective curvatures that the reflector 10 is desired to have.

Additionally, as seen in FIGS. 3 and 4, the reflector elements 14, 16 have generally trapezoidal profiles with the opposite side edges 14C of the reflector elements 14 being substantially straight and converging toward one another while the opposite side edges 16C of the reflector elements 16 are curved and converge toward one another. The configurations of the reflector elements 14, 16 are such that when the reflector elements 14 are held in the curved configurations by the pockets 22 between the side portions 20 of the support base 18 the straight side edges 14C of the reflector elements 14 lie along a curve which matches the curvature of the reflector elements 16 held by their corresponding side portions 20 of the support base 18 and their curved side edges 16C.

The polygonal reflector 10 also includes means that fasten at least each of the reflector elements 16 to corresponding ones of the side portions 20 of the support base 18. The fastening means preferably is a layer 26 of a suitable adhesive material that provides an adhesion connection of each of the reflector elements 16 at an exterior surface 16E thereof to the adjacent one of the side portions 20 of the support base 18. Preferably, but not necessarily, each of the reflector elements 14 at an exterior surface 14E thereof is also fastened by another layer 28 of adhesive material to the adjacent one of the side portions 20 of the support base 18. Such adhesion connections will prevent the reflector elements 14 from slipping or being pulled out relative to the respective pockets 22. For illustrative purposes only, the layers 26, 28 of adhesive material depicted in FIGS. 1 and 2 are shown thicker than would be necessary or would be implemented as a rule. The presence of the adhesive material layers 28, 26 providing the adhesion connections does not change the shaping of the reflector elements 14, 16 as predetermined by the support base 18. In this regard, the term adhesion connection or adhesive material refers to all of those connections between the support base 18 and the reflector elements 14, 16 by which the two joined parts are connected with one another by adhesion and/or cohesion and/or further physical/chemical processes. The support base 18 forms for the reflector elements 14, 16 a retaining base which is structured corresponding to the intended reflector curvature. The reflector elements 14, 16 connected through the adhesion connections with the support base 18 consequently have the same curvature as the support base 18 itself.

By way of an example, the polygonal reflector depicted in FIG. 1 is a rectangular reflector whose configuration 12 is built of four reflector elements, namely the two reflector elements 14 and the two reflector elements 16. The flexibility of the reflector elements 14, 16 facilitate their insertions into the support base 18 as well as their conformance with the curvature of the support base 18. The support base 18 is implemented as a housing that completely encompasses the configuration 12. As mentioned above, the retaining pockets 22 define grooves 22A and extend in conformance with the curvature of the side portions 20 of the support base 18. The pairs of retaining pockets 22, as depicted in FIG. 1, are disposed between, and at corners formed by, the side portions 20 of the support base 18 such that with respect to each pair of retaining pockets 22 each of the reflector elements 14, which are provided in a first sequence in the configuration 12 wherein they are alternating with the reflector elements 16 provided in a second sequence in the configuration 12, is set with its two opposite side edges 14C engaged in the opposing retaining pockets 22 of one pair thereof and its curvature fixed by the curvature of the retaining pockets 22. As mentioned above, for additional fixing and binding of the reflector elements 14 to the support base 18, a layer 28 of adhesive material is introduced between these the exterior surfaces 14E of the reflector elements 14 and their corresponding side portions 20 of the support base 18. To complete the configuration 12, the reflector elements 16 of the second sequence in the configuration 12 are set in the support body 18 after the reflector elements 14 of the first sequence in the configuration 12 are set therein and, if appropriate, are connected with it by means of the aforementioned adhesion connections. In the process of applying the adhesive material, the reflector elements 16 are placed uniformly in contact on the inside of the support base 18 and are held in this position until the adhesion has led to a secure connection of the reflector elements 16 to the support base 18. The reflector elements 16 adjoin with their lateral or opposite side edges 16C directly the reflection surfaces 14D of the reflector elements 14. Such structuring of the reflector inner edges 24 are thus solely dependent on the dimensional accuracy of the curvature of the opposite side edges of the reflector elements 16. The reflector inner edges 24 formed in this way meet even high illumination engineering requirements. The opposite side edges of 16C the reflector elements 16 can be chamfered outwardly for reducing the width of contact of such opposite side edges 16C with the reflection surfaces 14E of the reflector elements 14.

Referring to FIG. 2, at the lower termination of the configuration 12 the discrete reflector elements 14, 16 can be rounded off at the underside thereof. The support base 18 can also include at the underside thereof a collar 30 which is limited at the margin by a ring 32. The ring 32 can serve for receiving a lower ring covering as an enclosure.

It is evident in the foregoing description of the present invention that such a polygonal reflector 10 not only meets high illumination engineering requirements but also can be reproduced with simple conventional fabrication techniques. Two adjoining reflector elements 14, 16 structuring each reflector inner edge 24 are not disposed so as to abut at adjacent pair of the side edges thereof such that the structuring of the reflector inner edge does not depend on the dimensional accuracy of two reflector elements but depends only on the tolerance of the one reflector element 16. The reflector inner edge 24 formed in this way meets high illumination engineering requirements. In addition to the rectangular structuring of such reflector 10 can also be implemented polygonally, for example hexagonally or octagonally. Also, the support base 18 can, for example, be structured as a complete reflector housing or as a reflector frame structured similar to a framework structure, with the latter structure of the support base comprising sufficient contact surfaces in order to bring the reflector elements 14, 16 into the desired shape during their fastening and in order to provide sufficient fastening base.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A polygonal illumination reflector, comprising:

(a) a configuration of discrete reflector elements having respective pairs of opposite side edges and respective interior reflective surfaces, said reflector elements adjoining one another in providing said configuration thereof; and (b) a support base supporting said configuration of discrete reflector elements, said support base having a plurality of adjacent side portions and a plurality of retaining pockets defined between said adjacent side portions, said retaining pockets being arranged in pairs such that said retaining pockets of each pair open in a facing relationship toward one another so as to receive therein and set in engagement therewith said opposite side edges of said reflector elements in a first sequence in said configuration, said reflector elements in a second sequence in said configuration being disposed between said reflector elements of said first sequence and supported by corresponding ones of said side portions of said support base such that said reflective surfaces of said reflector elements of said first sequence and said opposite side edges of said reflector elements of said second sequence together form spaced apart inner edges on said configuration of discrete reflector elements.

2. The reflector of claim 1 wherein each of said reflector elements is flexible and said reflective surface thereof faces toward said reflective surface of one other of said reflector elements.

3. The reflector of claim 2 wherein said side portions of said base have curvatures which provide said reflector elements and thereby said reflective surfaces thereof with corresponding reflective curvatures.

4. The reflector of claim 1, further comprising:

means for fastening said reflector elements of said second sequence to corresponding ones of said side portions of said support base.

5. The reflector of claim 4 wherein said fastening means is an adhesive material that provides an adhesion connection of said reflector elements of said second sequence to said corresponding ones of said side portions of said support base.

6. The reflector of claim 1, further comprising:

means for fastening said reflector elements of said first sequence to corresponding ones of said side portions of said support base.

7. The reflector of claim 6 wherein said fastening means is an adhesive material that provides an adhesion connection of said reflector elements of said first sequence to said corresponding ones of said side portions of said support base.

8. The reflector of claim 1 wherein said reflector elements of said first sequence have generally trapezoidal profiles and said opposite side edges of said reflector elements of said first sequence are substantially straight and converge toward one another.

9. The reflector of claim 1 wherein said reflector elements of said second sequence have generally trapezoidal profiles and said opposite side edges of said reflector elements of said second sequence are curved and converge toward one another.

10. A polygonal illumination reflector, comprising:

(a) a configuration of discrete reflector elements having respective pairs of opposite side edges and respective interior reflective surfaces, said reflector elements adjoining one another in providing said configuration thereof; and (b) a support base supporting said configuration of discrete reflector elements, said support base having a plurality of adjacent side portions and a plurality of retaining pockets defined between and interconnecting said adjacent side portions to one another, said adjacent side portions corresponding in number to said reflector elements and said retaining pockets being arranged in pairs wherein each of said side portions of said support base is substantially coextensive with and disposed adjacent to one of said reflector elements, said retaining pockets of each pair thereof open in a facing relationship toward one another so as to receive therein and set in engagement therewith said opposite side edges of said reflector elements in a first alternating sequence in said configuration, and said reflector elements in a second alternating sequence in said configuration being disposed between said reflector elements of said first alternating sequence are supported by corresponding ones of said side portions of said support base such that said reflective surfaces of said reflector elements of said first alternating sequence and said opposite side edges of said reflector elements of said second alternating sequence together form spaced apart inner edges on said configuration of discrete reflector elements.

11. The reflector of claim 10 wherein each of said reflector elements is flexible and said reflective surface thereof faces toward said reflective surface of one other of said reflector elements.

12. The reflector of claim 11 wherein said side portions of said base have curvatures which provide said reflector elements and thereby said reflective surfaces thereof with corresponding reflective curvatures.

13. The reflector of claim 10, further comprising:

means for fastening said reflector elements of said second alternating sequence to corresponding ones of said side portions of said support base.

14. The reflector of claim 13 wherein said fastening means is an adhesive material that provides an adhesion connection of said reflector elements of said second alternating sequence to said corresponding ones of said side portions of said support base.

15. The reflector of claim 10, further comprising:

means for fastening said reflector elements of said first alternating sequence to corresponding ones of said side portions of said support base.

16. The reflector of claim 15 wherein said fastening means is an adhesive material that provides an adhesion connection of said reflector elements of said first alternating sequence to said corresponding ones of said side portions of said support base.

17. The reflector of claim 10 wherein said reflector elements of said first alternating sequence have generally trapezoidal profiles and said opposite side edges of said reflector elements of said first sequence are substantially straight and converge toward one another.

18. The reflector of claim 10 wherein said reflector elements of said second alternating sequence have generally trapezoidal profiles and said opposite side edges of said reflector elements of said second alternate sequence are curved and converge toward one another.

* * * * *